Nov. 6, 1928.

H. P. CORBIN

QUICK DETACHABLE DISK BEARING

Filed April 14, 1924

Inventor:
Henry P Corbin

Nov. 6, 1928.
H. P CORBIN
1,690,530
QUICK DETACHABLE DISK BEARING
Filed April 14, 1924
3 Sheets-Sheet 2
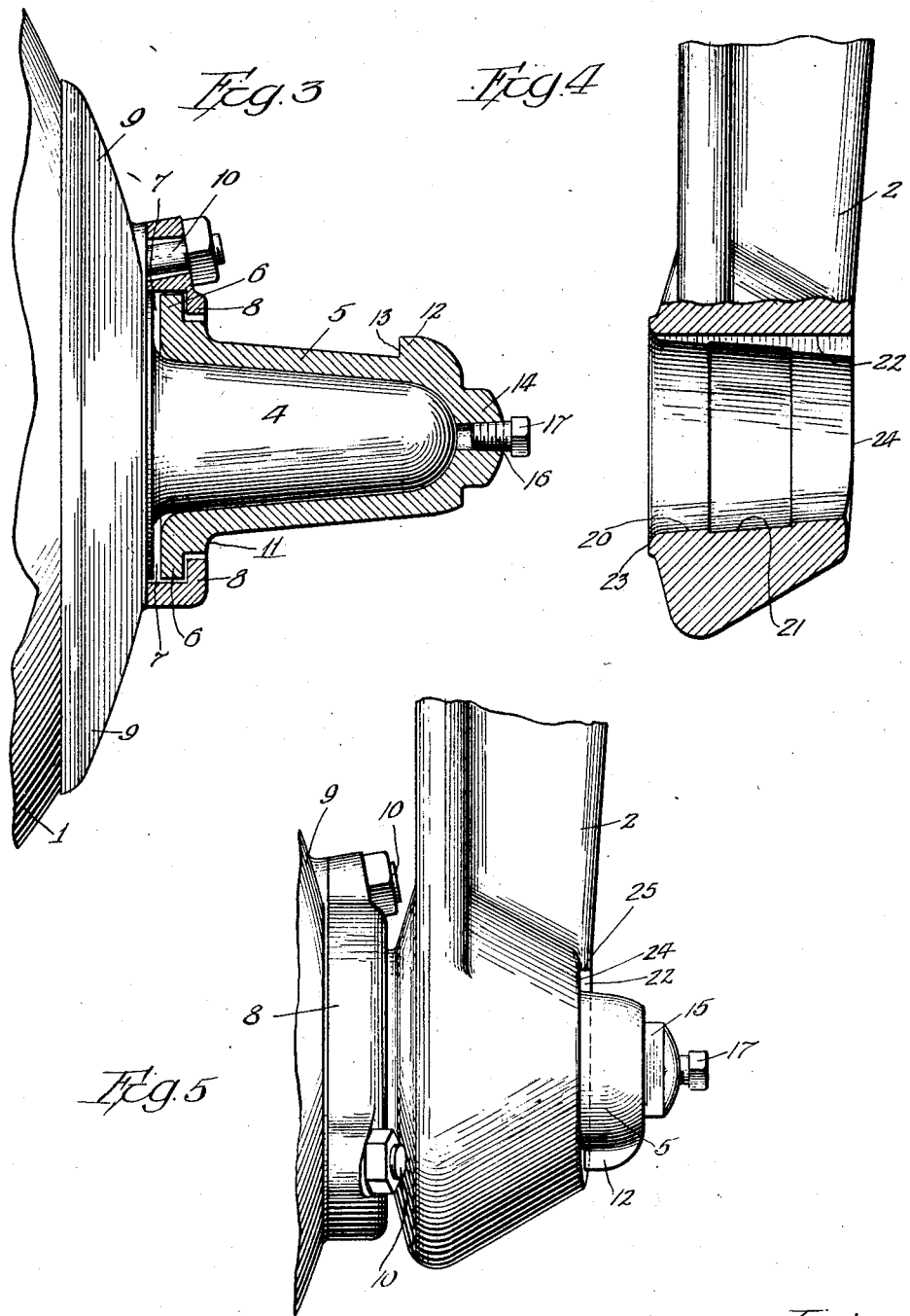

Nov. 6, 1928.
H. P. CORBIN
1,690,530
QUICK DETACHABLE DISK BEARING
Filed April 14, 1924    3 Sheets-Sheet 3
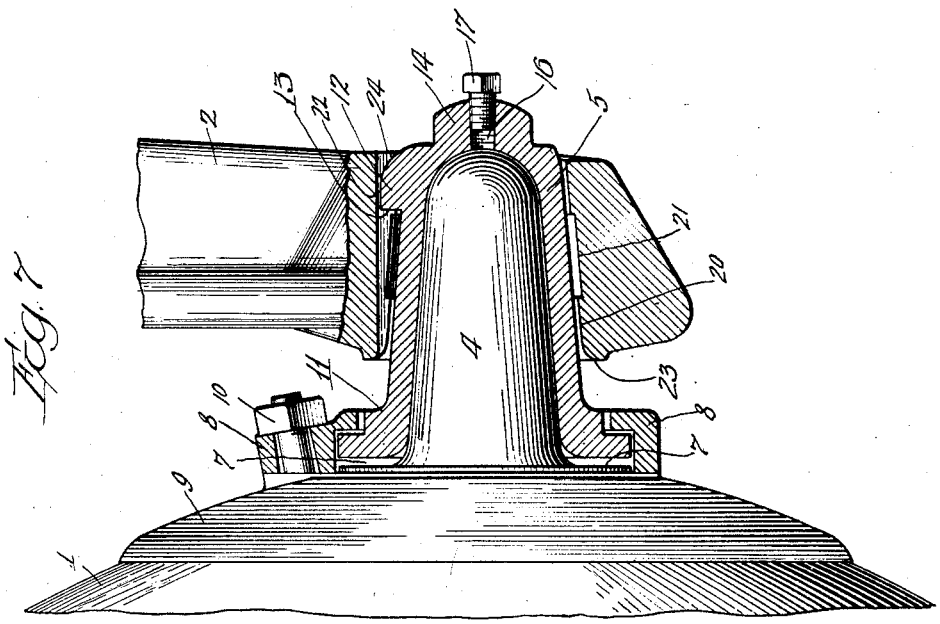
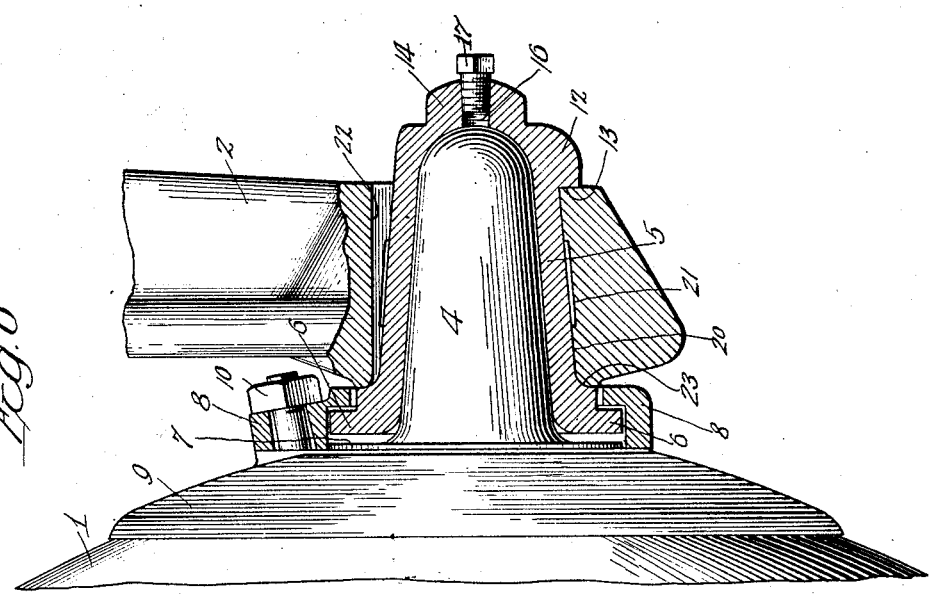
Inventor:
Henry P. Corbin Patented Nov. 6, 1928.

1,690,530

UNITED STATES PATENT OFFICE.

HENRY P. CORBIN, OF MOLINE, ILLINOIS, ASSIGNOR, BY MESNE ASSIGNMENTS, TO MOLINE IMPLEMENT COMPANY, A CORPORATION OF ILLINOIS.

QUICK-DETACHABLE DISK BEARING.

Application filed April 14, 1924. Serial No. 706,284.

The invention relates to a quick detachable disk bearing.

It relates particularly to a bearing for agricultural disks of the type used on disk plows and it is illustrated in connection with a disk plow.

Disk plows usually have a heavy wheeled frame carrying one or more rotary disks which are set at an angle to the direction in which the plow is pulled. As the plow moves forward, the disks turn up the ground and at the same time rotate. There is a very heavy thrust on each disk and its bearing must be such that the disk can absorb this thrust and at the same time rotate. Disk plows are used under difficult conditions where the moldboard plow will not operate. They must, therefore, be unusually rugged in their construction and this applies to the bearings as well as to the other parts of the plow. It is extremely desirable to have the bearings simple so that they will not get out of order and it is likewise desirable to have them easily removable so that the disks can be detached for repairs and so that the bearings themselves can be inspected or repaired, if necessary. The location of the bearings is such that they become covered with dirt and they are subjected to the action of the elements not only in plowing but because the implement is often allowed to stand in the open. The bearings are usually fastened in place by some fastening means such as bolts, nuts, or the like, which are not only tedious to manipulate but which often become rusted and stuck so as to make it a difficult job to remove the bearings. The present invention is directed to a solution of this problem and to the provision of a simple, durable bearing that can be quickly and easily attached and detached to the disk plow.

The general object of the invention is to provide an improved quick detachable disk bearing.

More particularly, the object is to provide a simple bearing that will operate efficiently under the rigid conditions of use in disk plowing and at the same time one which can be readily attached and detached without disconnecting any bolts, nuts, etc.

Other objects and advantages of the invention will appear from the specification and drawings.

An embodiment of the invention is illustrated in the drawings, in which

Figure 3 is a cross section of one part of the bearing.

Figure 4 is a cross section of another part of the bearing.

Figure 5 is a side elevation of the bearing in its assembled position.

Figure 6 is a cross section of the bearing in assembled position.

Figure 7 is a cross section showing the position of the parts when the bearing is being assembled.

Figure 1:
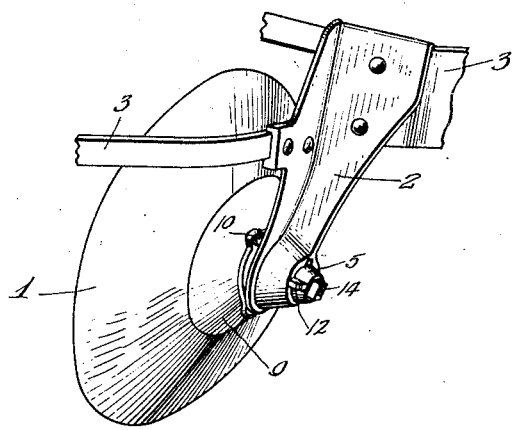
Figure 1 is a perspective view of a portion of a disk plow showing the improved bearing and the rear side of one of the plowing disks.

The disk plow with which the bearing is illustrated has a plowing disk 1 carried by an arm 2 attached to the framework 3 of the disk plow. The size and shape of the disk as well as the construction of the supporting arm and the framework may be varied to suit the requirements.

Fixed rigidly to the disk 1, as illustrated in Figure 3, is a tapered cone-shaped member 4 which is journalled in a tapered socket member 5. The inner end of the socket 5 has an outwardly projecting flange 6 which is received within an annular recess 7 formed by the flanged ring 8 bolted to the member 9 by bolts 10. The flanged ring 8 serves to hold the socket member 5 in position on the cone-shaped member but permits the cone-shaped member to rotate relative to the socket member.

Figure 2:
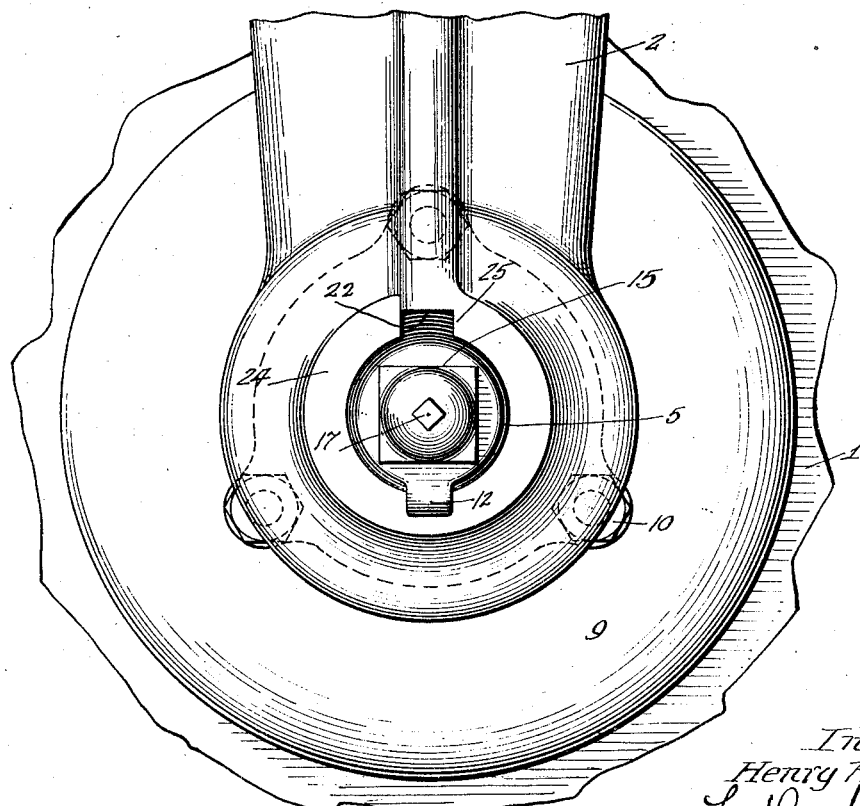
Figure 2 is a rear elevation of the bearing.

The socket member 5 has a shoulder 11 near its inner end, the purpose of which will be hereinafter described, and at its outer end it is provided with a projection or lug 12 having a cam face 13. The outer end 14 of the socket member is thicker than the side walls and it has straight sides 15 forming a square portion, illustrated in Figure 2 which may be grasped by a wrench. The outer end of the socket member is also provided with an opening which is closed by a screw threaded plug 17. This opening permits lubricant to be inserted through the end of the socket member. This can be done by screwing one of the many lubricating devices now on the market into the opening and forcing grease into the bearing. A portion of the lubricant may be retained in the opening 16 and forced into the cavity of the socket member by means of the plug 17.

The supporting arm 2 is provided with a tapered opening 20 for the reception of the socket member 5. The opening has an enlarged portion 21 illustrated most clearly in Figure 4. This opening provides a clearance near the center to cause the socket member 5 to contact the surface of the opening near its ends. As illustrated, the opening is made directly in the arm 2 but it will be understood that the shape of the supporting arm would be different in different types of implements and, in some cases, the arm might simply support a sleeve or other member having an opening 20 for receiving the socket 5.

A slot 22 is provided in the opening 20 to accommodate the lug 12 on the socket 5. When the bearing is being assembled the parts occupy the position illustrated in Figure 7, which shows the position of socket member 5 as it passes through the opening, the lug 12 being in the slot 22. In assembling the members, the socket 5 is inserted through the opening until the shoulder 11 contacts, or nearly contacts, the inner face 23 of the arm. The parts are proportioned so that, when they are in this position, the lug 12 has passed the rear surface 24 of the arm 2. The socket member 5 can then be turned because the lug, being out of the slot, will not interfere with the turning movement.

The rear surface 24 adjacent the opening 20 is cam shaped. It is best illustrated in Figure 5. The slot 22 is at the top of the opening 20 and the surface 24 is inclined from that point to a point 180 degrees from it so that, as the socket member 5 is turned, the cam face 13 of the lug 12 contacts the surface 24 and forces the shoulder 11 against the surface 23. The socket member is thus effectually locked in position on the arm.

The inclination of the surface 24 is preferably in a direction such that the normal rotation of the disk 1 during plowing tends to tighten the socket in position. The other half, or 180 degrees, of the surface 24 is not inclined, as illustrated, but it will be understood that this surface can be inclined also if desired. At the point where the surface 24 again joins the slot 22, there is an offset 25 which acts as a stop to prevent the socket member 5 from being rotated in the wrong direction.

To assemble the bearing, it is simply necessary to insert the socket member 5 through the opening 20 with the lug 12 passing through slot 22 and give the socket a turn. In fact, a turn of the disk will often turn the socket to place. This tightens the bearing on the arm and the rotation of the disk during plowing tends to increase the tightness. The socket 5 firmly grasps the arm between the shoulder 11 and the lug 12.

When it is desired to detach the bearing, the socket member is turned in reverse direction. Sometimes this can be done by hand but if not, a wrench can be placed on the square end of the socket member to turn the socket member until the lug 12 comes opposite the slot 22, after which the disk and bearing can be quickly removed.

It will be noted that the bearing can thus be attached and detached without the use of any additional parts such as bolts, nuts, cotters and the like and without detaching or attaching portions of either the socket member or the supporting member. Rust, dirt and so forth cannot interfere with its action. There are no rusted bolts, nuts, cotters or the like to unfasten. There are no parts to become lost or misplaced. The bearing is extremely simple. It is susceptible of inexpensive manufacture. It has proved very durable in practice and it is extremely convenient in use on account of its capacity for being quickly attached and detached.

It is to be understood that the construction shown is for purposes of illustration and that variations may be made in it without departing from the spirit and scope of the invention as defined by the claims.

I claim:

1. A quick-detachable, agricultural-disk bearing having a cone-shaped member, a socket member in which the cone-shaped member is journalled for rotation, means for holding the socket member on the cone-shaped member but permitting relative rotation of the two, said socket member having a projected lug near its rear end and a shoulder near its forward end, and supporting means having an opening for receiving the socket member, which opening is provided with a slot to receive the lug, said supporting means having a cam surface adjacent the rear end of its opening so that by passing the lug through the slot and turning the socket member, the cam surface will co-operate with the lug to cause it to force the shoulder into contact with the supporting means to thereby tighten and hold the socket member in the supporting means.

2. In a disk plow, a disk, a cone-shaped member carried by the disk, a socket member in which the cone-shaped member is journalled for rotation, means for holding the socket member on the cone-shaped member but permitting relative rotation of the two, said socket member having a projected lug near its rear end and a shoulder near its forward end, and supporting means having an opening for receiving the socket member which opening is provided with a slot to receive the lug, said supporting means having a cam surface adjacent the rear end of its opening so that by passing the lug through the slot and turning the socket member, the cam surface will co-operate with the lug to cause it to force the shoulder into contact with the supporting means to thereby tighten and hold the socket member in the supporting means, said cam surface being shaped so that the rotation of the disk during plowing tends to tighten the socket member in the supporting means.

3. In a disk plow, a disk, a cone-shaped member carried by the disk, a tapered socket member in which the cone-shaped member is journalled for rotation, said socket member having a projecting lug near its outer end and a shoulder and an annular flange near its inner end, an annular flange member attached to the disk and co-operating with the annular flange on the socket member to hold the socket member in position on the cone member but permitting relative rotation of said members, a supporting means, said supporting means having a tapered opening to receive the socket member, which opening is provided with a slot to receive the lug on the socket member, said supporting means having a cam surface adjacent the rear end of the opening so that by passing the lug through the slot in the opening and turning the socket member the lug will co-operate with the cam surface to pull the shoulder of the socket member against the supporting means and thereby tighten and hold the socket member firmly in position.

4. In a disk plow, a disk, a cone-shaped member carried by the disk, a tapered socket member in which the cone-shaped member is journalled for rotation, said socket member having a projected lug near its outer end and a shoulder and an annular flange near its inner end, an annular flange member attached to the disk and co-operating with the annular flange on the socket member to hold the socket member in position on the cone-shaped member but permitting relative rotation of the two, an arm for supporting the disk, said arm having a tapered opening to receive the socket member which opening is provided with a slot to receive the lug on the socket member, the rear surface of said arm adjacent its opening being cam-shaped so that, by passing the lug through the slot and turning the socket member, the lug will co-operate with the cam surface of the arm to pull the shoulder of the socket member against the arm and tighten and hold the socket member firmly in position, the shape of the cam surface being such that the rotation of the disk during plowing tends to tighten the socket member.

5. In a disk plow, a disk, a cone-shaped member carried by the disk, a tapered socket member in which the cone-shaped member is journalled for rotation, said socket member having a projecting lug near its outer end and a shoulder and an annular flange near its inner end, an annular flange member attached to the disk and co-operating with the annular flange on the socket member to hold the socket member in position on the cone-shaped member but permitting the two to rotate relative to one another, an arm for supporting the disk, said arm having a tapered opening to receive the socket member, which opening is provided with a slot to receive the lug on the socket member, the rear surface of said arm adjacent its opening being cam shaped so that by passing the lug through the slot in the arm opening and turning the socket member the lug will co-operate with said surface to tighten and hold the socket member firmly in position, the shape of the cam surface on said arm being such that the rotation of the disk during plowing tends to tighten the socket member in the arm, the rear portion of said socket member being shaped to receive a wrench so that the socket member may be easily turned in reverse direction to position the lug adjacent the slot to permit ready removal of the socket member, said socket member also having an opening in its rear end through which lubricant may be inserted and a removable closure for said opening.

In testimony whereof, I affix my signature.

HENRY P. CORBIN.